United States Patent
Li et al.

(10) Patent No.: US 12,469,321 B2
(45) Date of Patent: Nov. 11, 2025

(54) METHOD IMPLEMENTED IN COMPUTER SYSTEM FOR ANALYZING DOCUMENT VERSIONS TO IDENTIFY SHARED DOCUMENT ELEMENTS USING MACHINE LEARNING, AND NON-TRANSITORY COMPUTER-READABLE STORAGE MEDIUM

(71) Applicant: International Business Machines Corporation, Armonk, NY (US)

(72) Inventors: Ying Li, Shanghai (CN); Liu Yao He, Beijing (CN); Di Hu, Shanghai (CN); Xiao Feng Ji, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 18/170,053

(22) Filed: Feb. 16, 2023

(65) Prior Publication Data

US 2024/0282136 A1  Aug. 22, 2024

(51) Int. Cl.
 *G06V 30/416* (2022.01)
 *G06F 16/31* (2019.01)
 *G06T 3/4046* (2024.01)

(52) U.S. Cl.
 CPC .......... *G06V 30/416* (2022.01); *G06F 16/31* (2019.01); *G06T 3/4046* (2013.01); *G06T 2207/20212* (2013.01); *G06T 2207/30144* (2013.01); *H04N 2201/3226* (2013.01)

(58) Field of Classification Search
 None
 See application file for complete search history.

(56) References Cited

U.S. PATENT DOCUMENTS

| | | | |
|---|---|---|---|
| 10,067,920 B2 | 9/2018 | Teevan et al. | |
| 10,339,378 B2 | 7/2019 | Panferov et al. | |
| 10,845,945 B2 | 11/2020 | Smyth et al. | |
| 10,896,357 B1 | 1/2021 | Corcoran et al. | |
| 11,862,305 B1 * | 1/2024 | Sethi | G06V 30/416 |

(Continued)

FOREIGN PATENT DOCUMENTS

CN   112307737 A   2/2021

OTHER PUBLICATIONS

Bengio et al., "Estimating or Propagating Gradients Through Stochastic Neurons for Conditional Computation", Retrieved from: https://arxiv.org/pdf/1308.3432, Aug. 2013, 12 pages.

(Continued)

*Primary Examiner* — Haris Sabah
(74) *Attorney, Agent, or Firm* — Harrity & Harrity, LLP

(57) ABSTRACT

A present invention embodiment analyzes documents. A first document is received comprising a plurality of sentences that each include one or more words. A matrix is populated with the plurality of sentences, wherein each of the one or more words of each sentence in the matrix is encoded as a numerical value. The matrix is processed using a machine learning model to generate a first feature map. The first feature map is compared to a second feature map of a corresponding second document to identify a shared document element between the first document and the second document based on a common feature in the first feature map and the second feature map. The shared document element is indicated via a user interface.

20 Claims, 9 Drawing Sheets

(56) References Cited

U.S. PATENT DOCUMENTS

| | | | |
|---|---|---|---|
| 2008/0215314 A1* | 9/2008 | Spangler | G06F 18/23213 |
| | | | 704/10 |
| 2009/0169110 A1* | 7/2009 | Masuyama | G06F 16/31 |
| | | | 382/209 |
| 2011/0158483 A1* | 6/2011 | Ming | G06V 30/414 |
| | | | 382/112 |
| 2011/0213736 A1* | 9/2011 | Diao | G06N 20/00 |
| | | | 706/12 |
| 2021/0004579 A1 | 1/2021 | Phipps et al. | |
| 2022/0130163 A1* | 4/2022 | Kumar | G06F 16/93 |

OTHER PUBLICATIONS

Glorot et al., "Understanding the difficulty of training deep feedforward neural networks", Proceedings of Machine Learning Research, vol. 9, 2010, 8 pages.

Oord et al., "Neural Discrete Representation Learning", Retrieved from: https://arxiv.org/pdf/1711.00937, May 2018, 11 pages.

\* cited by examiner

| | 1 | 2 | 3 | 4 | 5 | 6 | 7 | ... | 1019 | 1020 | 1021 | 1022 | 1023 | 1024 |
|---|---|---|---|---|---|---|---|---|---|---|---|---|---|---|
| 410 — 1 | COLE | HOPED | HIS | GATHERING | WOULD | HAVE | A | ... | BEGAN | PLAYING | THEIR | INSTRUMENTS | AND | MOST |
| 420 — 2 | OF | THE | SPECTATORS | CLAPPED | [PAD] | [PAD] | [PAD] | ... | [PAD] | [PAD] | [PAD] | [PAD] | [PAD] | [PAD] |
| 430 — 3 | THE | SOUTH | ISLAND | OYSTERCATCHER | HAEMATOPUS | FINSCHI | IS | ... | NEW | ZEALAND | [PAD] | [PAD] | [PAD] | [PAD] |
| ... | ... | ... | ... | ... | ... | ... | ... | ... | ... | ... | ... | ... | ... | ... |
| 1024 | [PAD] | [PAD] | [PAD] | [PAD] | [PAD] | [PAD] | [PAD] | ... | [PAD] | [PAD] | [PAD] | [PAD] | [PAD] | [PAD] |

| | 1 | 2 | 3 | 4 | 5 | 6 | 7 | ... | 1019 | 1020 | 1021 | 1022 | 1023 | 1024 |
|---|---|---|---|---|---|---|---|---|---|---|---|---|---|---|
| 1 | 85.0 | 124.0 | 144.0 | 204.0 | 432.0 | 345 | 269.0 | ... | 494.0 | 167.0 | 209.0 | 203.0 | 67.0 | 435.0 |
| 2 | 309.0 | 399.0 | 387.0 | 288.0 | 0.0 | 0.0 | 0.0 | ... | 0.0 | 0.0 | 0.0 | 0.0 | 0.0 | 0.0 |
| 3 | 399.0 | 103.0 | 378.0 | 335.0 | 377.0 | 300.0 | 34.0 | ... | 414.0 | 83.0 | 0.0 | 0.0 | 0.0 | 0.0 |
| ... | ... | ... | ... | ... | ... | ... | ... | ... | ... | ... | ... | ... | ... | ... |
| 1024 | 0.0 | 0.0 | 0.0 | 0.0 | 0.0 | 0.0 | 0.0 | ... | 0.0 | 0.0 | 0.0 | 0.0 | 0.0 | 0.0 |

METHOD IMPLEMENTED IN COMPUTER SYSTEM FOR ANALYZING DOCUMENT VERSIONS TO IDENTIFY SHARED DOCUMENT ELEMENTS USING MACHINE LEARNING, AND NON-TRANSITORY COMPUTER-READABLE STORAGE MEDIUM

BACKGROUND

1. Technical Field

Present invention embodiments relate to machine learning, and more specifically, to analyzing different versions of documents to identify shared document elements using machine learning.

2. Discussion of the Related Art

Product documentation is a form of technical documentation that is created to describe the use, functionality, or architecture of a product, system or service. For example, product documentation can include a product manual, repair manual, user guide, software development kit documentation, and the like. As a product is developed, the addition, modification, and/or removal of functions may require revising of the documentation. When product documentation is revised, single topics can be split into multiple topics, or multiple topics may be merged into a single topic. Thus, when a user is only familiar with a particular version of a product's documentation, the user may not be able to easily locate contents in other versions of the documentation.

SUMMARY

According to one embodiment of the present invention, a system is provided for analyzing documents. A first document is received comprising a plurality of sentences that each include one or more words. A matrix is populated with the plurality of sentences, wherein each of the one or more words of each sentence in the matrix is encoded as a numerical value. The matrix is processed using a machine learning model to generate a first feature map. The first feature map is compared to a second feature map of a corresponding second document to identify a shared document element between the first document and the second document based on a common feature in the first feature map and the second feature map. The shared document element is indicated via a user interface. Embodiments of the present invention further include a method and computer program product for analyzing documents in substantially the same manner described above.

BRIEF DESCRIPTION OF THE DRAWINGS

Generally, like reference numerals in the various figures are utilized to designate like components.

FIGS. 4A and 4B are tables illustrating matrix representations of documents according to an embodiment of the present invention.

DETAILED DESCRIPTION

Figure 1:
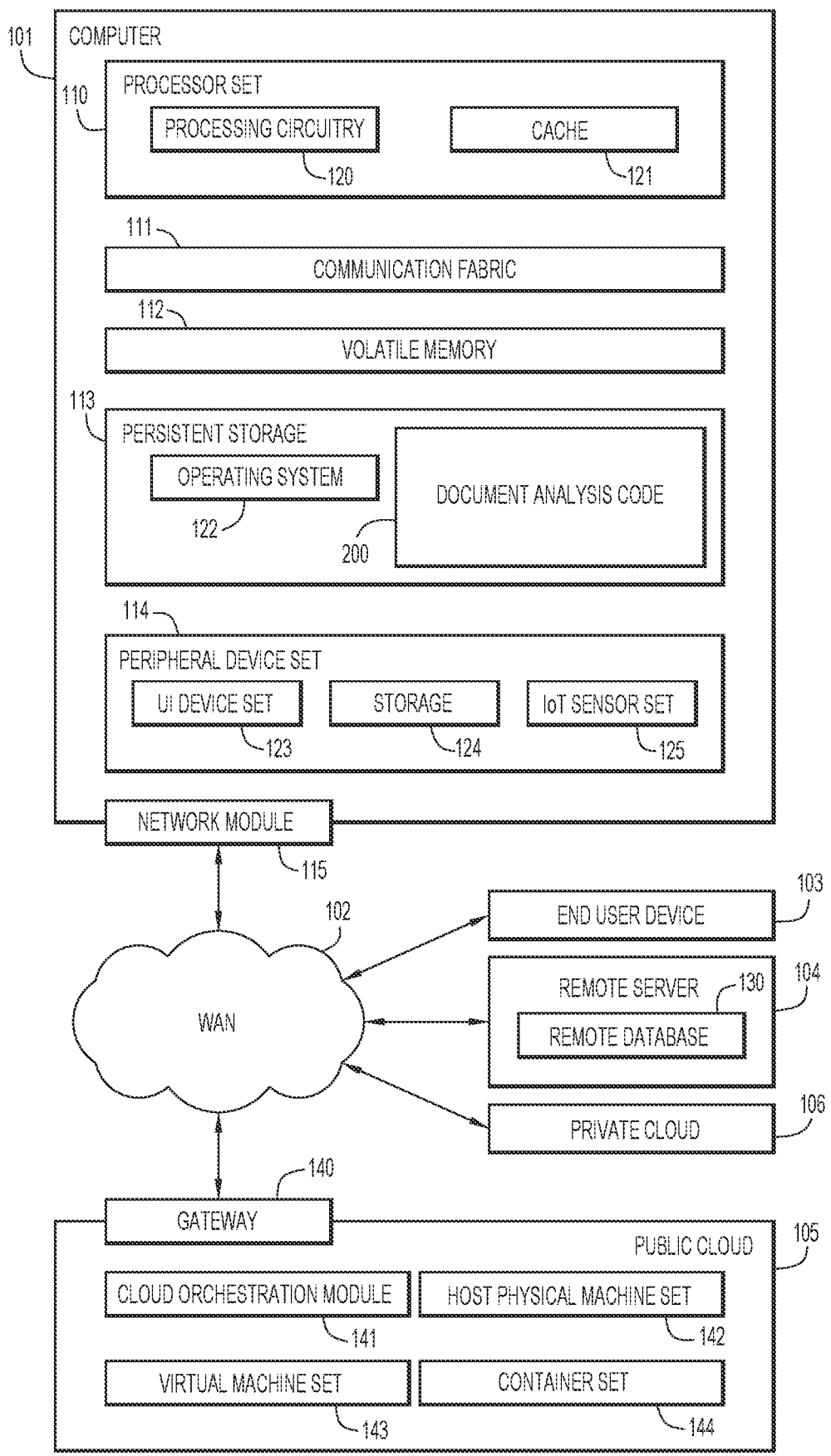
FIG. 1 is a diagrammatic illustration of an example computing environment according to an embodiment of the present invention.

A present invention embodiment relates to machine learning, and more specifically, to analyzing different versions of documents to identify shared document elements using machine learning. When different versions of a document (e.g., a product documentation, other technical document, etc.) exist, a user who is familiar with a particular version of the document may have trouble finding document elements in another version of the document. For example, document elements in one version may be divided across two or more sections in a later version, or formerly-disparate document elements may be merged into a same section.

Thus, present invention embodiments analyze documents in order to identify common document elements that may reside in different portions of the documents. A machine learning-based approach can be employed that utilizes a neural network to automatically identify common document elements regardless of their respective locations in compared documents. In particular, the text of documents may be represented as a matrix that is similar to a pixelated image in order to adapt image-processing machine learning approaches in order to identify common document elements. Thus, present invention embodiments provide a novel approach to document analysis by modifying image processing techniques in order to process text.

Accordingly, present invention embodiments improve the field of document analysis by employing a machine learning model in an unconventional manner that improves the accuracy at which common elements can be identified in compared documents. Rather than merely seeking common words or phrases, present invention embodiments utilize pattern recognition techniques to more accurately identify common document elements. Moreover, user feedback can be collected to continuously improve the accuracy of machine learning models over time by re-training the models.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as document analysis code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
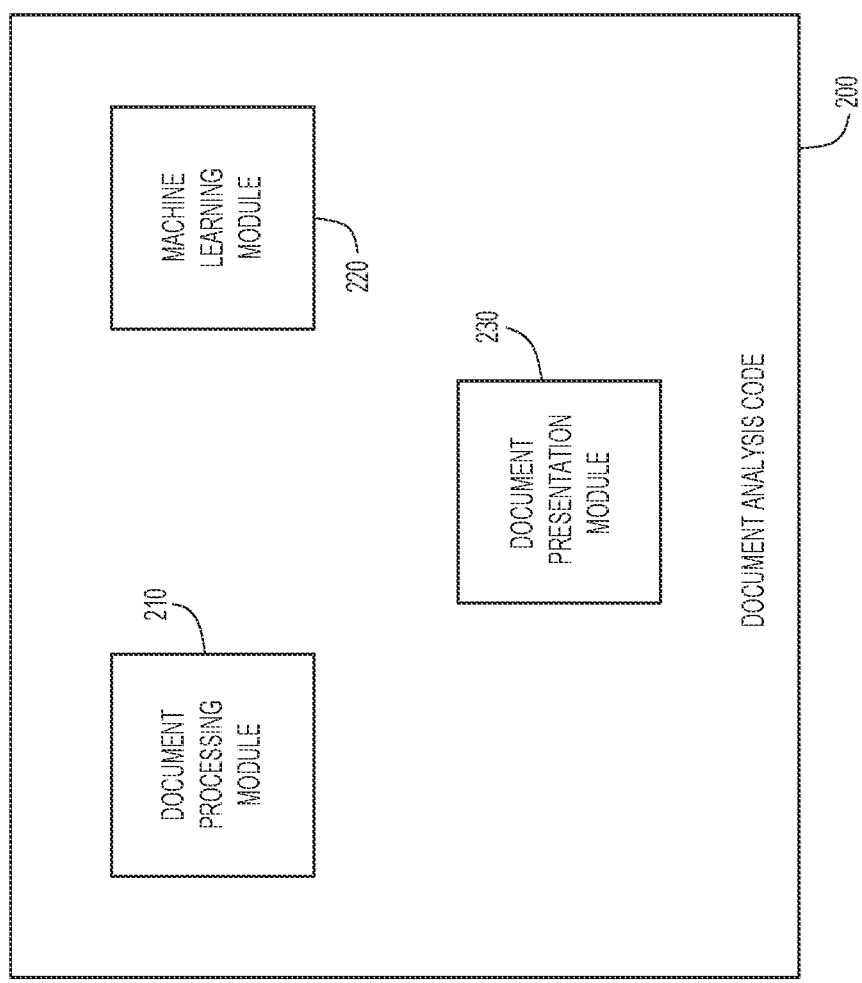
FIG. 2 is a block diagram of document analysis code according to an embodiment of the present invention.

A block diagram of document analysis code 200 according to an embodiment of the present invention is illustrated in FIG. 2. Specifically, document analysis code 200 includes a document processing module 210, a machine learning module 220, and a document presentation module 230.

Document processing module 210 may receive or obtain documents to be compared, and process the documents in order to prepare the documents for analysis by machine learning techniques in accordance with present invention embodiments. Initially, document processing module 210 may receive or obtain documents in any format, such as a Portable Document Format (PDF), Hypertext Markup Language (HTML) format, and the like. The documents may correspond to two or more different versions of a product documentation or other technical documentation. In some embodiments, document processing module 210 accesses a network-accessible resource to obtain the documents, such as a website of the manufacturer or a product or provider of a service. In some embodiments, document processing module 210 converts each document from one format to another as a pre-processing operation. Document processing module 210 may perform other pre-processing tasks, such as removing formatting (e.g., underlining, etc.).

Once the documents are obtained (and optionally pre-processed), document processing module 210 prepares the documents for processing by a machine learning model by populating a matrix using each document. Each matrix may be a rectangular or square matrix; in one embodiment, each matrix is a 1024×1024 matrix. To populate a matrix, a document may be processed sentence-by-sentence, with each new sentence populating a new row of the matrix. Each word in a sentence may occupy one cell of the row, and any unfilled cells may be populated with a null value. If a sentence's word count exceeds the matrix width, then the remaining words may populate the next row, and any unoccupied cells of that row may likewise be populated with null values. Prior to populating a cell or after populating a cell, each word may be encoded as a numerical value. For example, an integer encoding schema may be employed in which each word is mapped to a particular number. Alternatively, a conventional or other one-hot encoding technique may be employed to generate numerical values based on each word. Accordingly, document processing module 210 may output a matrix whose fields each include a particular number. The generated matrix may thus resemble an image file in which each pixel is described using a numerical value that would correspond to a particular color.

Machine learning module 220 may receive matrices corresponding to two or more documents and compare the matrices to identify common document elements. The document elements may include sentences, paragraphs, or other groupings of text, which may have been modified to a particular degree from one version to another. Thus, matching document elements may not include verbatim sequences of words from one document to another. In various embodiments, machine learning module 220 may include a neural network (e.g., a convolutional neural network, recurrent neural network, etc.) or other machine learning model suitable for pattern recognition tasks. In one embodiment, machine learning module 220 may include a modified vector quantized variational autoencoder (VQ-VAE) or other image-generating model (e.g., a generative adversarial network).

In some embodiments, machine learning module 220 may identify one or more corresponding document elements in one document based on a user selection of one or more document elements in another document (e.g., a user may input a document element as a query to identify matching document elements). In other embodiments, machine learning module 220 may exhaustively identify each corresponding document element in compared documents. Machine learning module 220 is depicted and described in further detail below with reference to FIG. 5.

Document presentation module 230 may receive indications of common document elements in two or more documents from machine learning module 220 and generate a user interface to present the common document elements to a user. In some embodiments, document presentation module 230 may employ a color-code scheme in which corresponding document elements have a same font color, underlining color, or highlighting color. In other embodiments, document presentation module 230 may provide a visual link between documents, such as boxes around corresponding content and a connecting line between boxes, or a hyperlink that enables a user to jump from corresponding portions of documents. Document presentation module 230 may present two or more documents side-by-side so that a user can view both simultaneously in order to see which document elements correspond to each other.

Figure 3A:
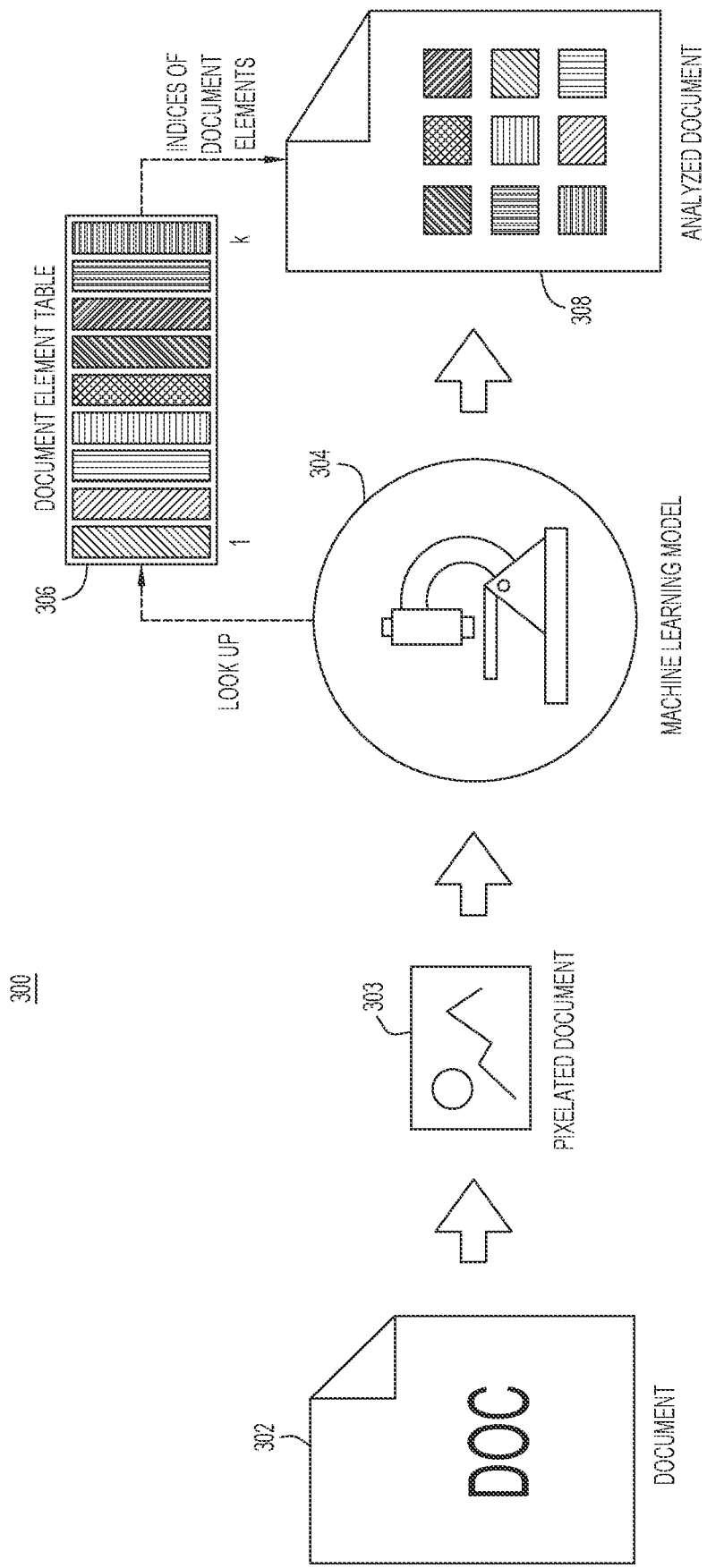
FIG. 3A is a diagrammatic illustration of a process of analyzing documents according to an embodiment of the present invention.

With reference now to FIG. 3A, a diagrammatic illustration is shown of a process 300 of analyzing documents according to an embodiment of the present invention. Initially, a document 302 is received for analysis. Next, the document is converted into pixelated document 303 by encoding the words of each sentence as numerical values in a matrix; pixelated document 302 may be generated by document processing module 210, depicted and described with reference to FIG. 2.

Pixelated document 303 may be analyzed by a machine learning model 304 (which may correspond to machine learning module 220 as depicted and described with reference to FIG. 2) in order to generate vectors based on the document that can be compared to other vectors in a document element table 306. Document element table 306 may include a plurality of vectors whose embeddings have been learned during the training of machine learning model 304 using a set of training documents. Each vector of document element table 306 may include an index indicating a particular document element, and each vector extracted from pixelated document 303 may be compared to the vectors of document element table 306 to identify a closest vector (e.g., via cosine similarity, nearest-neighbor mapping, etc.), and accordingly, an index for the document element corresponding to the vector. Thus, an analyzed document 308 may be generated that can be tagged with the indices of its various document elements. This analyzed document 308 can then be compared to a similarly-generated document to identify similar document elements on the basis of their matching indices.

Figure 3B:
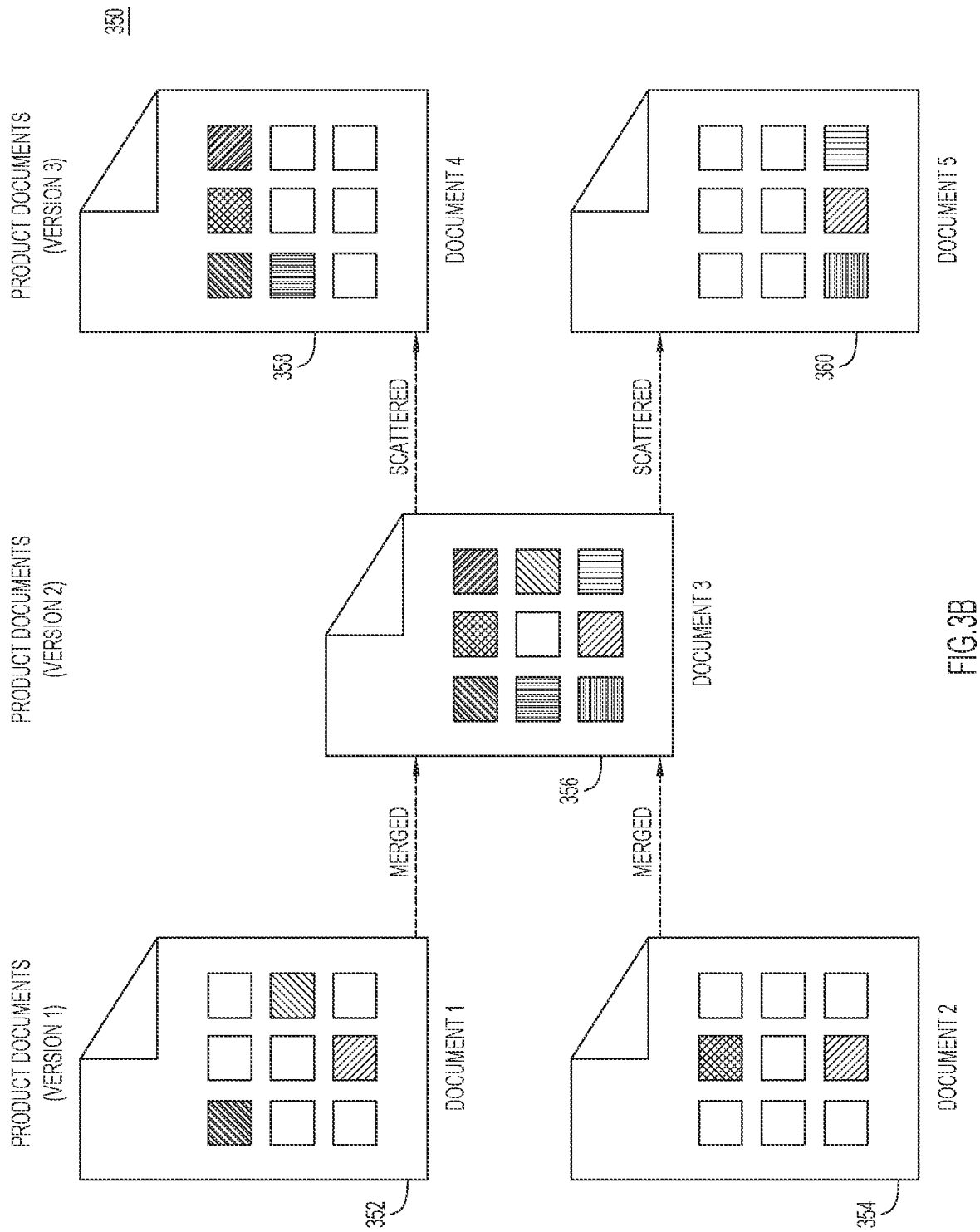
FIG. 3B is a diagrammatic illustration of various versions of a document according to an embodiment of the present invention.

FIG. 3B is a diagrammatic illustration 350 of various versions of a document according to an embodiment of the present invention. As depicted, two different documents 352 and 354 represent a first version of product documentation. For example, document 352 may be an operator's manual and document 354 may be a repair manual. In a second version, documents 352 and 354 are merged during the revision process to result in document 356. For example, document 356 may include both operating instructions and details relating to repair of a product. Finally, in a third round of revisions, a third version of documents is created, resulting again in two separate documents 358 and 360. As depicted, present invention embodiments can identify portions of the documents (indicated by hatching) that are common across different versions of the documents.

FIGS. 4A and 4B are tables illustrating matrix representations 400 and 450 of documents according to an embodiment of the present invention. As depicted in FIG. 4A, matrix representation 400 is a 1024×1024 matrix in which a portion is shown that is populated by two sentences. A first sentence recites "Cole hoped his gathering would have a . . . began playing their instruments and most of the spectators clapped," and is populated into the matrix one word per cell beginning on a first cell of row 410 and proceeding left-to-right. Since this sentence is longer than 1024 words, the sentence proceeds to similarly occupy a second row 420. The next sentence, "The south Island oystercatcher *Haematopus finschi* is . . . New Zealand" begins on a new row 430, and likewise populates row 430 proceeding left-to-right. Null values [PAD] 440 are inserted wherever there are unoccupied cells. It should be appreciated that while this example embodiment populates matrix representation 400 in a top-to-bottom and left-to-right convention (which matches the English convention), any other convention may be employed. In some embodiments, if a document exceeds the size of a matrix (e.g., if a document requires more rows than 1024 in the depicted example), then the document may span multiple matrices as needed.

With reference to FIG. 4B, a matrix representation 450 is shown corresponding to matrix representation 400, with the words encoded as numerical values. Each word may be encoded using a same encoding schema, such as a one-hot encoding or other schema. In some embodiments, the numerical values may be integers, float values, and/or integers that are converted to float values. Matrix representation 450 may be generated by document processing module 210 of document analysis code 200 and provided to machine learning module 220 for analysis in accordance with present invention embodiments.

Figure 5:
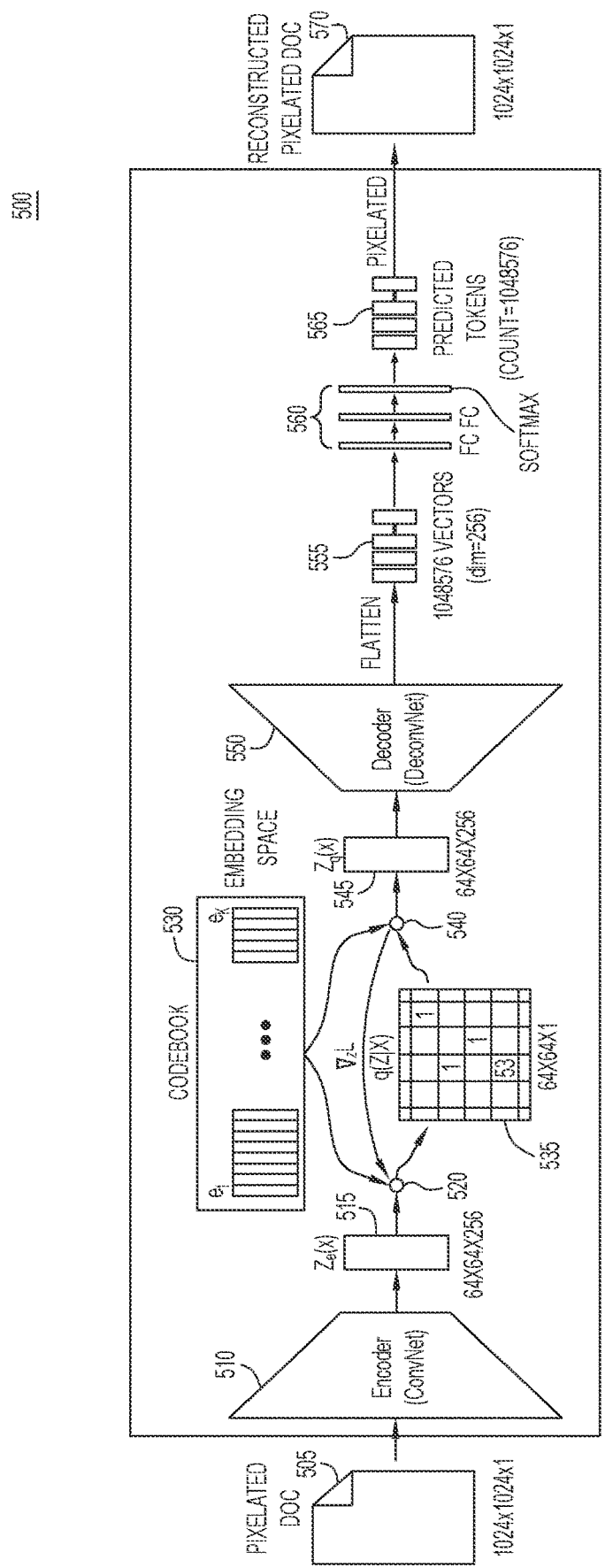
FIG. 5 is a block diagram depicting a machine learning model that is trained and applied according to an embodiment of the present invention.

FIG. 5 is a block diagram depicting a machine learning model 500 that is trained and applied according to an embodiment of the present invention. This machine learning model 500 may be a vector quantized variational autoencoder type model.

Initially, a matrix representation 505 of a document (e.g., a pixelated document) is received at an encoder 510. Encoder 510 may include a convolutional neural network that processes matrix representation 505 to output a feature map 515 comprising a plurality of vectors. In the depicted example, matrix representation 505 is a 1024×1024 matrix, and feature map 515 is a 64×64×256 embedding space, which corresponds to a total of 4,096 256-dimensional content feature vectors.

At operation 520, nearest-neighbor mapping is performed by accessing the embeddings in codebook 530, which is an embedding space that is obtained via training. For each vector of feature map 515, a codebook vector that is most similar is identified (e.g., via cosine similarity, nearest-neighbor mapping, or other techniques), which has a corresponding index value that is populated into table 535. Table 535 is then used to generate feature map 545 at operation 540 by fetching the codebook embedding (e.g., a 256-dimension vector) for each index value where each index value is located in table 535. $\nabla_z L$ is a gradient that is passed back to encoder 510 during training.

In order to compare documents, machine learning model 500 only needs to obtain an index value for each vector of a document's feature map 515 so that same index values can be obtained. When index values match, their corresponding document features can be identified and presented in accordance with present invention embodiments. However, during training of machine learning model 500, decoder 550 is utilized to generate a reconstructed matrix representation 570. Training is performed to obtain embeddings for encoder 510, decoder 550, and codebook 530 such that reconstructed matrix representation 570 is most similar to matrix representation 505.

During training, sets of training documents are used that represent different versions of documents (e.g., product documentation). Once feature map 545 is obtained for a training document, feature map 545 is processed by decoder 550, which may be a convolutional network that has a similar architecture to encoder 510 except that decoder 550 performs deconvolution rather than convolution. Decoder 550 may output a tensor 555 that includes a plurality of vectors that decoder 550 flattens. In some embodiments, tensor 555 may have a size of 1024×1024×256 (e.g., 1,048,576 256-dimensional vectors). The vectors of tensor 555 may then be processed through layers 560, which can include two or more fully-connected layers and/or a Softmax layer, in order to generate the text tokens 565. Text tokens 565 may then be used to assemble reconstructed matrix representation 570 by sequentially populating a matrix with text tokens 565.

During training of machine learning model 500, embeddings of codebook 530 are learned. Codebook 530 may include a number K of embeddings $\{e_1, \ldots, e_K\}$, $\forall e_k \in \mathbb{R}^d$, where K is hyperparameter that indicates the number of latent document-element categories, and d indicates the dimensionality of each vector. In some embodiments, K may be set to 8,192, and d may be set to 256. At the beginning of training, the embeddings of codebook 530 can be initialized using random values or by any initialization technique, such as Xavier uniform initialization. During the training of encoder 510, decoder 550, and codebook 530, a loss function may be used that is based on a straight-through estimator. In one embodiment, the loss function may be described as:

$$\|x - \text{Rec}(z + sg[z_q - z])\|_2^2 + \beta \|sg[z] - z_q\|_2^2 + \gamma \|z - sg[z_q]\|_2^2$$

wherein $\gamma$ and $\beta$ are hyper-parameters that control the relative importance of factors respectively, and $\gamma < \beta$. In one embodiment, $\gamma = 0.25 * \beta$. Moreover, sg may indicate a stop gradient, x may indicate a matrix representation of a document from a training dataset that is used as input to the encoder 510, and $\mathbb{R}(\cdot)$ may indicate a reconstructed matrix representation that is generated by decoder 550 and layers 560 by processing the input that is provided to decoder $z_q$ (i.e. 545). Backpropagation may be employed to update the parameters of machine learning model 500.

Figure 6:
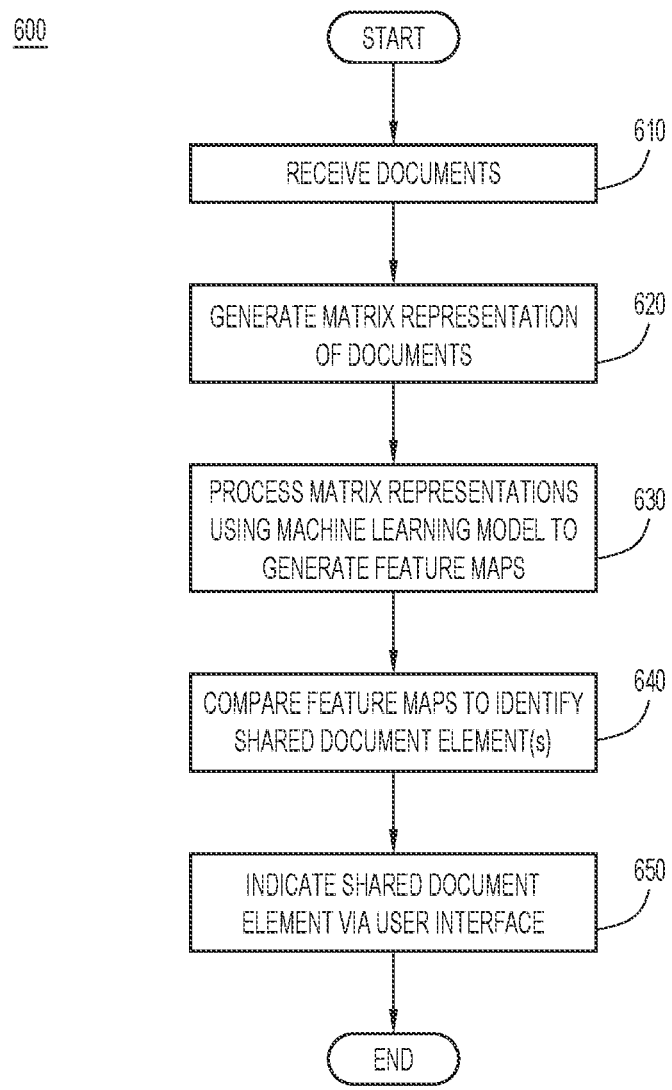
FIG. 6 is a flowchart of a method for analyzing documents according to an embodiment of the present invention.

FIG. 6 is a flowchart of a method 600 for analyzing documents according to an embodiment of the present invention.

Documents are received at operation 610. The documents may correspond to two or more documents that a user desires to compare in order to identify shared document elements between the documents. For example, a first document may be a product documentation with which a user is familiar, and a second document may be another version of the product documentation with which the user is unfamiliar due to revisions. The documents may be submitted to a computing system (e.g., computer 101) for analysis.

A matrix representation is generated for each document at operation 620. Text is extracted from each document on a sentence basis, and each sentence is populated into a matrix representation, with one word occupying a cell of the matrix. If a sentence's word count is longer than the number of cells in a row of the matrix (e.g., the number of columns), then the sentence may continue on a next row. When a sentence does not fully populate a row, the remaining cells may be populated with null values. Additionally, each word may be encoded as a numerical value by using an encoding technique, such as one-hot encoding. The numerical values may be integer values that are converted to float values.

The matrix representations are processed using a machine learning model to generate feature maps for each matrix representation at operation 630. The machine learning model may generate feature maps by converting each document into a set of vectors. In one embodiment, the machine learning model is a vector quantized variational autoencoder that includes a trained encoder for encoding the matrix representations into feature maps.

The feature maps are compared to identify one or more shared document elements at operation 640. In some embodiments, a codebook that includes a trained embedding space of vectors is used to compare the feature maps. In particular, each vector in a feature map may be compared to the codebook to select a codebook vector that is closest to the feature map vector, and when two vectors from different feature maps correlate to a same codebook vector, then those vectors, and accordingly, the document elements to which they correspond, may be identified as shared between documents. In some embodiments, the text of the identified document elements may be compared to determine semantic similarity beyond a threshold value in order to ensure that those document elements are indeed shared elements. For example, a Word Mover's Distance or other algorithm may be employed to compare respective document elements of the two documents.

The one or more shared document elements are indicated via a user interface at operation 650. A user interface may present the documents alongside each other, with visual indicators showing any shared elements between documents. In some embodiments, the visual indicators may include colors, bounding boxes, underlining, and the like. In some embodiments, one document may be presented at a time, and a user may select a document element to navigate to the shared document element of the other document.

Figure 7:
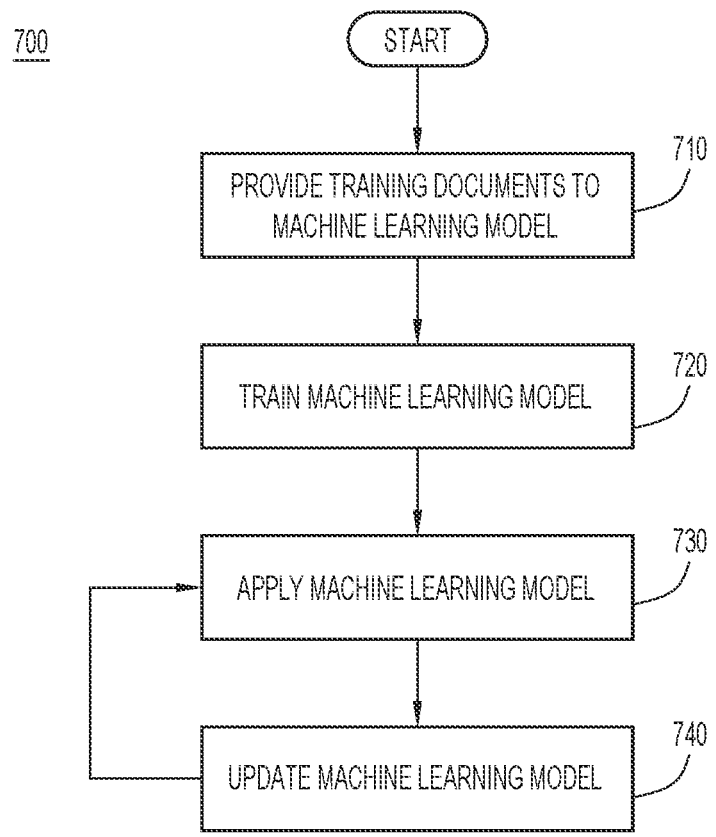
FIG. 7 is a flowchart of a method for training a machine learning model according to an embodiment of the present invention.

FIG. 7 is a flowchart of a method 700 for training a machine learning model according to an embodiment of the present invention.

Training documents are provided to the machine learning model at operation 710. The training documents may include sets of documents, with each set including two or more documents that are different versions of product documentation. Each document may be pre-processed to remove formatting and to otherwise prepare the documents for text extraction. Each document may be converted into a matrix representation similar to an image in which words are represented as numerical values in an array.

The machine learning model is trained at operation 720. The machine learning model may include a modified vector quantized variational autoencoder type model that includes an encoder, codebook, and decoder each having their own embedding space. The encoder may encode documents as feature maps (e.g., sets of vectors), which are processed based on the embeddings of the codebook and converted into reconstructed matrix representations by the decoder. During training, the embedding spaces of the encoder, decoder, and codebook are adjusted using a loss function so that the reconstructed matrix representation of each training document most closely resembles the original matrix representation of that training document.

The machine learning model is applied at operation 730. The machine learning model's encoder and codebook may be utilized to compare input documents in order to identify shared document features. User feedback may be collected in order to determine whether the document features are indeed shared or not. Thus, the accuracy of the model may be assessed with use.

The machine learning model is updated at operation 740. Based on user indications of whether the shared document features that are predicted by the model are accurate or inaccurate, the model may be retrained using those documents or other documents in order to improve the accuracy of the machine learning model over time.

It will be appreciated that the embodiments described above and illustrated in the drawings represent only a few of the many ways of implementing embodiments for analyzing documents to identify common features using machine learning.

The environment of the present invention embodiments may include any number of computer or other processing systems (e.g., any computing device, medical imaging device, computing service, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system. These systems may include any types of monitors and input devices (e.g., keyboard, mouse, voice recognition, etc.) to enter and/or view information.

It is to be understood that the software of the present invention embodiments (e.g., document processing module 210, machine learning module 220, document presentation module 230, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, distributed computing, and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the computing system. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., document data, machine learning model data, identified common document feature data, user feedback data etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

Document data, machine learning model data, identified common document feature data, and/or user feedback data may include any information arranged in any fashion, and may be configurable based on rules or other criteria to provide desired information to a user (e.g., a clinician).

The present invention embodiments are not limited to the specific tasks or algorithms described above, but may be utilized for identifying similarities in any form of data, including text data, audio data, image data, and the like.

The data may include any format of storing data and may include any data descriptive of different versions of a document. The data may be obtained via any techniques, and may be accessed over a network, fetched from local storage, provided via user input, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of analyzing documents comprising:
    receiving a first document comprising a plurality of sentences that each include one or more words;
    populating a matrix with the plurality of sentences, wherein each of the one or more words of each sentence in the matrix is encoded as a numerical value;
    processing the matrix using a machine learning model to generate a first feature map;
    comparing the first feature map to a second feature map of a second document to identify a shared document element between the first document and the second document based on a common feature in the first feature map and the second feature map, wherein comparing the first feature map to the second feature map comprises comparing a first vector of the first feature map and a second vector of the second feature map to a codebook comprising an embedding space of codebook vectors to determine that the first vector and the second vector are both closest to a same codebook vector; and
    indicating the shared document element via a user interface.

2. The computer-implemented method of claim 1, wherein the machine learning model comprises an encoder, a decoder, and the codebook.

3. The computer-implemented method of claim 2, wherein the machine learning model is trained using a plurality of training matrices by:
    processing each training matrix using the encoder, to generate a first training feature map;

processing the first training feature map by accessing embeddings in the codebook to fetch a codebook embedding vector for each vector of the first training feature map that is most similar to each vector of the first training feature map;
generating a second training feature map that includes codebook embedding vectors fetched from the codebook; and
processing the second training feature map, using the decoder, to generate a reconstructed training matrix, wherein the reconstructed training matrix is compared to the training matrix for each iteration of training to learn embeddings for the encoder, the decoder, and the codebook.

4. The computer-implemented method of claim 1, wherein the machine learning model is trained using a plurality of training matrices obtained from a plurality of training documents that include different versions of documentation for same products.

5. The computer-implemented method of claim 1, wherein each of the one or more words of each sentence in the matrix is encoded using one-hot encoding.

6. The computer-implemented method of claim 1, wherein indicating the shared document element comprises applying a same visual indicator to the shared document element in the first document and the second document.

7. The computer-implemented method of claim 1, wherein the comparing the first feature map to the second feature map comprises using a nearest-neighbor mapping to compare the first vector of the first feature map and the second vector of the second feature map to the embedding space of codebook vectors.

8. A computer system for analyzing documents comprising:
one or more memories; and
at least one processor coupled to the one or more memories, wherein the at least one processor is configured to:
receive a first document comprising a plurality of sentences that each include one or more words;
populate a matrix with the plurality of sentences, wherein each of the one or more words of each sentence in the matrix is encoded as a numerical value;
process the matrix using a machine learning model to generate a first feature map;
compare the first feature map to a second feature map of a second document to identify a shared document element between the first document and the second document based on a common feature in the first feature map and the second feature map, wherein to compare the first feature map to the second feature map, the at least one processor is configured to compare a first vector of the first feature map and a second vector of the second feature map to a codebook comprising an embedding space of codebook vectors to determine that the first vector and the second vector are both closest to a same codebook vector; and
indicate the shared document element via a user interface.

9. The computer system of claim 8, wherein the machine learning model comprises an encoder, a decoder, and the codebook.

10. The computer system of claim 9, wherein to train the machine learning model using a plurality of training matrices, the at least one processor is configured to:

process each training matrix, using the encoder, to generate a first training feature map;
process the first training feature map by accessing embeddings in the codebook to fetch a codebook embedding vector for each vector of the first training feature map that is most similar to each vector of the first training feature map;
generate a second training feature map that includes codebook embedding vectors fetched from the codebook; and
process the second training feature map, using the decoder, to generate a reconstructed training matrix, wherein the reconstructed training matrix is compared to the training matrix for each iteration of training to learn embeddings for the encoder, the decoder, and the codebook.

11. The computer system of claim 8, wherein the machine learning model is trained using a plurality of training matrices obtained from a plurality of training documents that include different versions of documentation for same products.

12. The computer system of claim 8, wherein each of the one or more words of each sentence in the matrix is encoded using one-hot encoding.

13. The computer system of claim 8, wherein indicating the shared document element comprises applying a same visual indicator to the shared document element in the first document and the second document.

14. The computer system of claim 8, wherein to compare the first feature map to the second feature map, the at least one processor is configured to use a nearest-neighbor mapping to compare the first vector of the first feature map and the second vector of the second feature map to the embedding space of codebook vectors.

15. A non-transitory computer-readable medium storing a set of instructions for analyzing documents, the set of instructions comprising:
one or more instructions that, when executed by one or more processors of a device, cause the device to:
receive a first document comprising a plurality of sentences that each include one or more words;
populate a matrix with the plurality of sentences, wherein each of the one or more words of each sentence in the matrix is encoded as a numerical value;
process the matrix using a machine learning model to generate a first feature map;
compare the first feature map to a second feature map of a second document to identify a shared document element between the first document and the second document based on a common feature in the first feature map and the second feature map, wherein the one or more instructions, to cause the device to compare the first feature map to the second feature map, cause the device to compare a first vector of the first feature map and a second vector of the second feature map to a codebook comprising an embedding space of codebook vectors to determine that the first vector and the second vector are both closest to a same codebook vector; and
indicate the shared document element via a user interface.

16. The non-transitory computer-readable medium of claim 15, wherein the machine learning model comprises an encoder, a decoder, and the codebook.

17. The non-transitory computer-readable medium of claim 16, wherein the one or more instructions further cause the device to train the machine learning model using a plurality of training matrices, and wherein the one or more instructions, to cause the device to train the machine learning model, cause the device to:
- process each training matrix, using the encoder, to generate a first training feature map;
- process the first training feature map by accessing embeddings in the codebook to fetch a codebook embedding vector for each vector of the first training feature map that is most similar to each vector of the first training feature map;
- generate a second training feature map that includes codebook embedding vectors fetched from the codebook; and
- process the second training feature map, using the decoder, to generate a reconstructed training matrix, wherein the reconstructed training matrix is compared to the training matrix for each iteration of training to learn embeddings for the encoder, the decoder, and the codebook.

18. The non-transitory computer-readable medium of claim 15, wherein the machine learning model is trained using a plurality of training matrices obtained from a plurality of training documents that include different versions of documentation for same products.

19. The non-transitory computer-readable medium of claim 15, wherein each of the one or more words of each sentence in the matrix is encoded using one-hot encoding.

20. The non-transitory computer-readable medium of claim 15, wherein the one or more instructions, to cause the device to indicate the shared document element, cause the device to apply a same visual indicator to the shared document element in the first document and the second document.

* * * * *